(12) United States Patent
Follestad et al.

(10) Patent No.: US 6,921,799 B1
(45) Date of Patent: Jul. 26, 2005

(54) OLEFIN POLYMERIZATION PROCESS

(75) Inventors: Arild Follestad, Stathelle (NO); Hannu Salminen, Porvoo (FI)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/457,574

(22) Filed: Dec. 9, 1999

Related U.S. Application Data

(63) Continuation of application No. PCT/GB98/01747, filed on Jun. 16, 1998, now abandoned.

(30) Foreign Application Priority Data

Jun. 16, 1997 (GB) ............................... 9712663

(51) Int. Cl.$^7$ ................................. G08F 2/38
(52) U.S. Cl. ............................. 526/65; 526/64; 526/87; 526/160; 526/901; 526/905; 525/53; 525/247
(58) Field of Search ............................. 526/64, 65, 87, 526/160, 901, 905, 281, 339, 347; 525/53, 247

(56) References Cited

U.S. PATENT DOCUMENTS

| | | | |
|---|---|---|---|
| 4,962,262 A | 10/1990 | Winter et al. | |
| 5,232,993 A | * 8/1993 | Winter et al. | ................ 525/247 |
| 5,276,115 A | 1/1994 | Bohmer et al. | |
| 5,478,898 A | 12/1995 | Standaert | |
| 6,380,311 B1 | 4/2002 | Razavi et al. | |

FOREIGN PATENT DOCUMENTS

| | | |
|---|---|---|
| EP | 0398350 A2 | 11/1990 |
| EP | 0 603 935 B1 | 6/1994 |
| EP | 0 881 237 A1 | 12/1998 |
| EP | 0570051 A1 | 11/1999 |
| WO | WO 92/15619 | 9/1992 |
| WO | WO 94/17112 | 8/1994 |
| WO | WO 95/07942 | 3/1995 |
| WO | WO 97/07942 | 3/1995 |
| WO | WO 96/34895 | 11/1996 |
| WO | WO 97/03124 | 1/1997 |

* cited by examiner

*Primary Examiner*—Fred Teskin
(74) *Attorney, Agent, or Firm*—Nixon & Vanderhye P.C.

(57) ABSTRACT

The invention relates to a process for the preparation of an olefin polymer comprising at least two polymerization stage in the presence of an olefin polymerization catalyst material, an olefin polymer produced by such process, and the use of such polymers for the production of fibres, pipes, films, moulded products and products for wire and cable applications.

25 Claims, 1 Drawing Sheet

OLEFIN POLYMERIZATION PROCESS

CROSS REFERENCE TO RELATED APPLICATIONS

Figure 1:
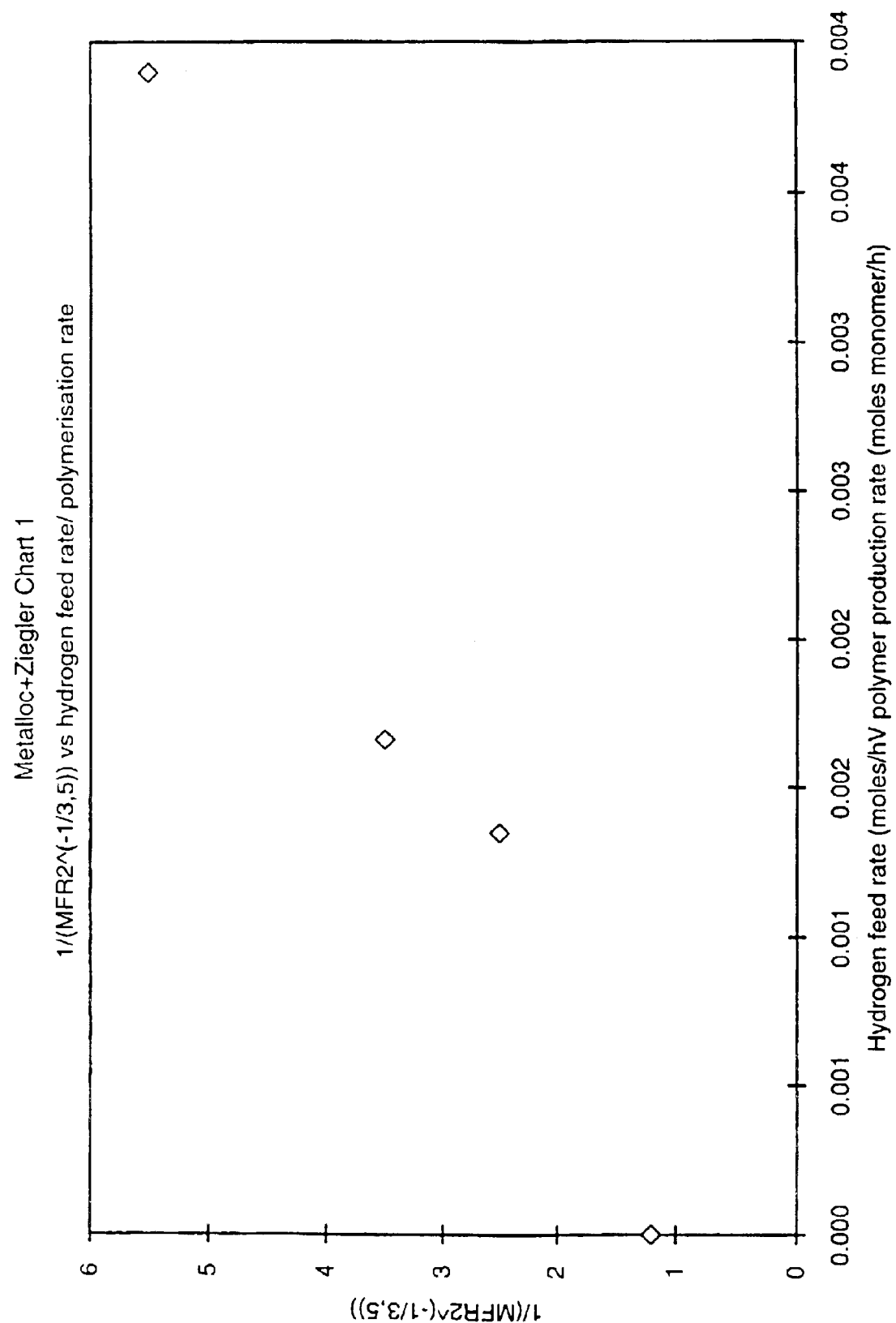

This application is a Continuation of the U.S. designation of International Application No. PCT/GB98/01747, filed Jun. 16, 1998 now abandoned.

BACKGROUND OF THE INVENTION

This invention relates to a process for the preparation of olefin polymers, in particular a multi-stage process in which hydrogen and a metallocene or other single site catalyst are present in the reaction mixture in at least one of the earlier polymerization stages, as well as to olefin polymers produced thereby.

In the preparation of olefin polymers it is known to use a variety of catalyst systems, e.g. Ziegler Natta catalysts, metallocene catalysts, chromium catalysts, and chromocene-silica catalysts as well as to perform the polymerization in one or more stages, e.g. in two or more reactors arranged in series. Typically such reactors may be gas phase or slurry phase reactors or a combination of slurry phase and gas phase reactors.

One of the reasons for using multistage polymerization reactions has been to produce a final polyolefin product which has a broad, bimodal or multimodal molecular weight distribution and which as a result has improved processability (see for example WO92/15619 (Phillips Petroleum)).

In WO92/15619 there is described a process for preparing bimodal polyolefins by a two stage polymerization in which in the first stage a relatively higher molecular weight copolymer is produced and in which in the second stage hydrogen is present and a relatively lower molecular weight homopolymer is formed. The catalyst used in the first and second stages is a metallocene or a mixture of metallocenes.

BRIEF SUMMARY OF THE INVENTION

We have now surprisingly found that such multistage olefin polymerizations may be performed more efficiently and without the need for certain interstage reaction mixture treatment steps if in an earlier stage (e.g. the first of two stages) an olefin polymerization is effected in the presence of hydrogen and a rapidly hydrogen consuming catalyst, e.g. a metallocene or other single site catalyst, to produce a relatively lower molecular weight (higher $MFR_2$) polymer and in a later stage (e.g. the second of two stages) an olefin polymerization is effected whereby to produce a relatively lower $MFR_2$ polymer. The variation in $MFR_2$ (or other measures of molecular weight) may be achieved by variation in hydrogen and comonomer concentrations or feed rates, e.g. using the same catalyst in both polymerizable stages but within the later stage lower hydrogen concentration and optionally the use of a comonomer or the use of a higher comonomer concentration.

Thus viewed from one aspect the invention provides a process for olefin polymerization, preferably for the production of an ethylene or propylene homo or copolymer, in particular for the preparation of ethylene copolymers, which process comprises at least two polymerization stages, a relatively earlier of said stages comprising polymerizing an α-olefin in the presence of hydrogen and an η-liganded olefin polymerization catalyst whereby to produce a first polymerization product, and a relatively later of said stages comprising polymerizing said α-olefin in the presence of an olefin polymerization catalyst whereby to yield a polymerization product having a lower $MFR_2$ than said first polymerization product.

When compared with a multistage process for production of a polyolefin having the same $MFR_2$ and density using a conventional Ziegler Natta catalyst the process of the invention makes it possible to avoid a costly hydrogen removal step between the polymerization stages since, unlike with the Ziegler Natta catalysed process, hydrogen is substantially entirely consumed in the early (high $MFR_2$ producing) stage. Without such hydrogen consumption, hydrogen removal is required in order to allow the desired higher molecular weight/lower $MFR_2$ to be achieved in the later polymerisation stage.

When compared with a multistage process such as that of WO92/15619, the process of the invention allows comonomer incorporation even when hydrogen is used and moreover the problem of removal of unreacted hydrogen or comonomer between the earlier and later polymerization stages can be avoided.

The process of the invention may optionally comprise: further polymerisation stages following the relatively later stage, e.g. to produce a heterophasic polymer; drying steps; blending of the polymer product with one or more further materials, e.g. further polymers, antioxidants, radiation (e.g. UV-light) stabilizers, antistatic agents, fillers, plasticizers, carbon black, colors, etc.; granulation, extrusion and pelletization; etc.

BRIEF DESCRIPTION THE DRAWINGS

FIG. 1 depicts a graph comparing the apparent viscosity vs. apparent shear for the products of Example 1 (invention) and Example 2 (comparative).

DETAILED DESCRIPTION OF THE INVENTION

Viewed from further aspects the invention provides an olefin polymer produced by a process according to the invention as well as the use of such polymers for the production of fibres, pipes, films, moulded products and products for wire and cable applications.

The process of the invention is one for the polymerization of α-olefins, in particular $C_{2-10}$ α-olefins, more particularly ethylene and propylene. The polymer product of each polymerization stage may be a homopolymer or a copolymer (which term is used to include polymers deriving from two or more monomer species). Where the product is a copolymer, preferably at least 50% by weight of the polymer derives from a $C_{2-10}$ α-olefin monomer, more particularly from a $C_{2-4}$ α-olefin monomer, preferably ethylene or propylene. The other monomer (s) may be any monomers capable of copolymerization with the olefin monomer, preferably mono or polyunsaturated $C_{2-20}$ compounds, in particular monoenes or dienes, especially $C_{2-10}$ α-olefins such as ethene, propene, but-1-ene, pent-1-ene, hex-1-ene, oct-1-ene or mixtures thereof. Bulky comonomers, e.g. styrene or norbornene may also be used. Generally, the polymer produced in the polymerization stages will comprise the same α-olefin monomer, e.g. as the sole monomer or as the comonomer from which at least 50%, preferably 60 to 99.8 of the copolymer derives. Thus the polymer product will preferably be an ethylene homopolymer, an ethylene copolymer, a propylene homopolymer or a propylene copolymer.

The catalysts used in the different polymerization stages may be the same or different; however the use of the same catalyst is preferred. Such catalysts may be any catalyst capable of catalysing olefin polymerization, e.g. Ziegler Natta, chromium, η-ligand complexed metals, etc. What is required is that the catalyst used in the relatively early polymerization stage be one which substantially depletes the reaction mixture of hydrogen, ie. it should be a catalyst which uses up hydrogen more rapidly than the conventional Ziegler Natta or non-metallocene chromium catalysts. In this regard it is particularly preferred to use catalytically effective metal:η-ligand complexes, ie. complexes in which the metal is complexed by the extended Π-orbital system of an organic ligand. Metallocenes are an example of complexes in which a metal is complexed by two η-ligands—in the present invention metal: η-ligand complexes may be used where the metal is complexed by one, two or more η-ligands. The use of metallocenes and "half metallocenes" (e.g. those available from Dow) however is particularly preferred. The metal in such complexes is preferably a group 4, 5, 6, 7 or 8 metal or a lanthanide or actinide, especially a group 4, 5 or 6 metal, particularly Zr, Hf or Ti. The η-ligand preferably comprises a cyclopentadienyl ring, optionally with a ring carbon replaced by a heteroatom (e.g. N or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Examples of such homo or heterocyclic cyclopentadienyl ligands are well known from the scientific and patent literature, e.g. from the published patent applications of Hoechst, Montell, Borealis, Exxon, and Dow, for example EP-A-416815, WO96/04290, EP-A-48521, EP-A-485823, U.S. Pat. No. 5,276,208 and U.S. Pat. No. 5,145,819.

Thus the η-bonding ligand may for example be of formula I $$CpY_m \qquad (I)$$

where Cp is an unsubstituted, mono-substituted or polysubstituted homo or heterocyclic cyclopentadienyl, indenyl, tetrahydroindenyl, fluorenyl, benzindenyl, cyclopenta[1]phenanthrenyl, azulenyl, or octahydrofluorenyl ligand; m is zero or an integer having a value of 1, 2, 3, 4 or 5; and where present each Y which may be the same or different is a substituent attached to the cyclopentadienyl ring moiety of Cp and selected from halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, especially C and Si (e.g. an ethylene group) to a second unsubstituted, mono-substituted or polysubstituted homo or heterocyclic cyclopentadienyl, indenyl, tetrahydroindenyl, fluorenyl or octahydrofluorenyl ligand group.

In the η-bonding ligands of formula I, the rings fused to the homo or hetero cyclopentadienyl rings may themselves be optionally substituted e.g. by halogen atoms or groups containing 1 to 10 carbon atoms.

Many examples of such η-bonding ligands and their synthesis are known from the literature, see for example: Möhring et al. J. Organomet. Chem 479:1–29 (1994), Brintzinger et al. Angew. Chem. Int. Ed. Engl. 34:1143–1170 (1995).

Examples of suitable η-bonding ligands include the following:

cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cycopentadieny, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Besides the η-ligand, the catalyst complex used according to the invention may include other ligands; typically these may be halide, hydride, alkyl, aryl, alkoxy, aryloxy, amide, carbamide or other two electron donor groups.

Where a Ziegler Natta catalyst is used in the later polymerization stage, this may be any convenient Ziegler Natta catalyst, e.g. a group 4 metal chloride (e.g. titanium chloride) associated with $MgCl_2$, MgO or $SiO_2$ (see also PCT/SE96/01652).

The catalyst systems used may of course involve co-catalysts or catalyst activators and in this regard any appropriate co-catalyst or activator may be used. Thus for η-ligand complexes, aluminoxane or boron compound cocatalysts may be used.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J in EP-A-617052 (Asahi)).

Aluminoxane co-catalysts are described by Hoechst in WO 94/28034. These are linear or cyclic oligomers having up to 40, preferably 3 to 20,  repeat units (where R" is hydrogen, $C_{1-10}$ alkyl (preferably methyl and/or isobutyl) or $C_{6-18}$ aryl or mixtures thereof) It is particularly desirable that the η-ligand complex be supported on a solid substrate for use in such polymerization reactions. Such substrates are preferably porous particulates, e.g. inorganic oxides such as silica, alumina, silica-alumina or zirconia, inorganic halides such as magnesium chloride, or porous polymer particles, e.g. acrylate polymer particles or styrene-divinylbenzene polymer particles which optionally carry functional groups such as hydroxy, carboxyl etc. Particle sizes are preferably in the range 10 to 60 µm and porosities are preferably in the range 1 to 3 mL/g. The complex may be loaded onto the support before, or more preferably after. it has been reacted with a co-catalyst. Desirably, inorganic supports are heat treated (calcined) before being loaded with the complex.

The processes of the invention may be carried out in a single reactor or in a series of two or more reactors. Each polymerization stage may be effected using conventional procedures, e.g. as a slurry, gas phase, solution or high pressure polymerization. Slurry polymerization (e.g. bulk polymerization) is preferably effected, e.g. in a tank reactor or more preferably a loop reactor. Preferably however the polymerization process uses a series of two or more reactors, preferably loop and/or gas phase reactors, e.g. a combination of loop and loop, gas phase and gas phase or most preferably loop and gas phase reactors. In such reactors, the (major) monomer may also function as a solvent/carrier as well as a reagent, or alternatively a non-polymerizable organic compound, e.g. a $C_{3-10}$ alkane, for example propane or isobutane, may be used as a solvent/carrier. Where this is done, the volatile non-reacted or non-reactive materials will desirably be recovered and reused, especially where gas phase reactors are used.

Typical reaction conditions for loop and gas phase reactors are: loop—temperature 60–110° C., pressure 30–70 bar, mean residence time 30–80 minutes; and gas phase—temperature 60–110° C., pressure 10–25 bar, mean residence time 20–300 minutes. Where hydrogen is used ton control molecular weight/$MFR_2$, the hydrogen partial pressure will typically be from about 0.001 to about 20 bar, from about 0.05 to about 20 bar, or from about 0.001 to 5 bar.

The polymer product of the process of the invention will preferably have a $MFR_2$ of 0.01 to 100, a weight average molecular weight (Mw) of 30000 to 500000, a melting point of 100–165° C. (e.g. 100–136° C. for polyethylenes and 120 to 165° C. for polypropylenes) and a crystallinity of 20 to 70%.

This polymer can be formulated together with conventional additives, e.g. antioxidants, UV-stabilizers, colors, fillers, plasticizers, etc. and can be used for fibre or film extrusion or for raffia, or for pipes, or for cable or wire applications or for moulding, e.g. injection moulding, blow moulding, rotational moulding, etc., using conventional moulding and extrusion apparatus.

In the process of the invention, control over the molecular weight of the polymer produced in a stage involving use of hydrogen and η-liganded catalyst can be readily achieved by monitoring of the hydrogen and monomer consumption, ie. for hydrogen the difference between hydrogen input and hydrogen output and for monomer the difference between monomer input and output. The ratio of hydrogen consumption to monomer consumption can be correlated well with polymer molecular weight or MFR (e.g. $MFR_2$) and the product molecular weight or MFR can accordingly be adjusted to the desired level using this correlation and by appropriate adjustment of the hydrogen and monomer feed rate levels. This is a novel means of molecular weight control and forms a further aspect of the invention. Viewed from this aspect the invention provides a method of olefin polymerization in a continuous throughput reactor, e.g. a gas phase or loop reactor, in which hydrogen and an olefin monomer are continuously introduced into said reactor and polymer and unreacted monomer are continuously removed from said reactor, characterised in that the ratio between the difference between hydrogen input into and output from the reactor and the difference between monomer input into and output from the reactor is determined and adjusted, e.g. manually, regularly or continuously, to a value within a desired range whereby to cause the polymer removed from said reactor to have a molecular weight related parameter, e.g. MFR (ie. melt flow rate, melt index, high load melt index etc, for example $MFR_2$, melt viscosity, intrinsic viscosity, weight average molecular weight, number average molecular weight, viscosity average molecular weight, etc.) or a polymer production rate within a corresponding desired range. Where hydrogen consumption is greater than 50%, preferably where it is greater than 80%, the difference between hydrogen input and hydrogen output may if desired be replaced simply by the hydrogen input value. Similarly, the difference between monomer input and output may be replaced by the polymer production rate.

In this method, the polymerization catalyst advantageously comprises an η-liganded metal as discussed herein, preferably a group 4 to 6 metal, particularly Zr, Hf or Ti and preferably other than Cr. The method is particularly advantageous when the ratio of hydrogen output from to hydrogen input to the reactor is from 0 to 50:100, especially 0 to 80:100. Furthermore the method is particularly suited to polymerization processes in which polymer particles are formed, e.g. bulk, slurry or gas phase reactions rather than solution reactions, for example processes where the reactor temperature is less than 115° C. The method is especially preferred for the production of ethene and propene homo- or copolymers (which latter term includes polymers comprising three or more comonomers).

The measurement of molecular weight (and related parameters) for polymers from a polyolefin-producing plant is usually done in a laboratory on samples of polymer powder taken out from the process after a reactor, often after an in-process drying step. Such measurement is resource-consuming, so usually samples are measured at intervals of many hours. This means that if an important deviation in such parameters is discovered, many hours of production of the deviating product may already have been made. More recently, in-line measurements based on melt viscosity are coming into use to reduce such risk. However, these instruments are not so reliable, and also often are placed far downstream of the process, so the ideal goal of getting a direct measurement of the molecular weight related parameter of the polymer being produced is not solved.

In order to produce a polymer with the right molecular weight related parameter, the following method is usually presently used:

1. Based on the goal, the previous measurements, and the concentrations in the reactor during the previous time (hydrogen, monomers, cocatalyst (if present)), reactor temperature and catalyst type, are used to calculate or guess a favourable value for the hydrogen concentration or the ratio between hydrogen concentration and monomer concentration.

2. The hydrogen concentration or the ratio between hydrogen concentration and monomer is maintained at this value.

3. Steps 1 and 2 are repeated through the process.

A control room person was usually required to perform step 1. Now computer control is usually used. Computer models predict behaviour of concentrations in the reactor as well as of molecular weight. Advanced models may use a mechanistic, kinetic approach to molecular weight control. Such an approach is shown in: K. McAuley and J. MacGregor, AlChE Journal, Vol. 37, no. 6, pages 825–835.

In the method of the invention the rate of chemically consumed molecular hydrogen may be found by mass balance as the difference between the rate of molecular hydrogen going into the reactor system and the sum of the rates of molecular hydrogen leaving the reactor and accumulating in the reactor.

The rate of consumption of monomer is best found by a heat balance of the reactor or a mass (or molar) balance of monomer, or a combination of these. By mass or molar balance method, the production rate of polymer is the difference between monomer going into the reactor system and the sum of the rates of monomer leaving the reactor and accumulating in the reactor. This balance might be done on weight basis or molar basis. By the heat balance method, the rate of heat generation by polymerisation is found as the difference between the sum of rates of heat removed by the cooling system, needed for heating of feed streams, accumulating in the reactor and for loss, and the sum of the rates of heat lost by the mass leaving the reactor system, and that generated by agitation. The polymerisation rate can then be found from the rate of heat generation by polymerisation.

The reactor system over which these mass and heat balances should be taken should in many cases include more than the reactor vessel itself. Thus for a fluidised gas phase reactor the optional cooling system taking gas from the reactor bed and returning it after cooling, optionally part of it in condensed form, is included in the reactor system. In slurry tank reactors the optional cooling system where cooling is effected by boiling liquid off from the slurry, then partly condensing the gas and returning the condensed liquid and residual gas to the slurry, is also included in the reactor system.

The ratio between rate of hydrogen chemical consumption and the rate of production of polymer in the reactor system can then be found.

In order to produce a polymer with the right molecular weight related parameter, the following method may thus be used:

1. Based on the goal and the last measurement period of the molecular weight related parameter, the reagent and catalyst and cocatalyst, the above ratio and the concentrations in the reactor during the previous period, reactor temperature and catalyst type, may be used to calculate or approximate a favourable set point for the ratio between rate of hydrogen chemical consumption and the rate of production of polymer.

2. The ratio between hydrogen consumption rate and monomer polymerization rate may be maintained at the value of this set point, preferably by controlling the hydrogen feed rate.

3. Repeat steps 1 and 2 at periodically.

If there is a high conversion of both the main monomer and hydrogen (for example, above 85%), a simple, approximate version of above step 1 would be to base control of molecular weight on the ratio of hydrogen feed over the polymer production rate.

For step no. 1, it is of interest to have a computer model of molecular weight versus reactor process operating data for the same purpose as the kinetic equation developed by McAuley et al. (supra).

The following is an example of development of such an equation system:

The number-average molecular weight of the polymer is the sum of chain transfer rates divided by the propagation rate $$(1) \quad \frac{1}{X_n} = \frac{r_o + r_h}{r_p} = \frac{r_o}{r_p} + \frac{r_h}{r_p} \tag{1}$$

$$(2) \quad \frac{1}{X_n} = f(c_{m1}, c_{m1}, c_{m2}, c_c, T, \ldots) + \frac{r_h}{r_p}$$

where $f(C_{m1}, C_{m1}, C_{m2}, C_c, T, \ldots)$ is a function of reactor parameters except hydrogen.

If $f(C_{m1}, C_{m1}, C_{m2}, C_c, T, \ldots)$ is constant, equation (2) can be written:

$$(3) \quad \frac{1}{X_n} = K + \frac{r_h}{r_p}$$

(where

| | |
|---|---|
| C | Concentration |
| K | Constant |
| r | Molar rate |
| T | Temperature |
| Xn | Number-average degree of polymerisation. |

Indexes:

| | |
|---|---|
| c | Cocatalyst |
| h | Hydrogen |
| m1 | Monomer 1 |
| m2 | Monomer 2 |
| o | Reactor parameters that are not related to hydrogen |
| p | Propagation |

From the number-average degree of polymerisation one can reach other molecular weight relevant parameters. For instance, MFR is usually considered related to this as:

$$MFR = \text{Constant} \cdot (X_n)_\alpha \tag{4}$$

Usually $\alpha$ is found to be about:

$$\alpha = -3.5 \tag{5}$$

When the catalyst consumes hydrogen fast and also reduces molecular weight very fast with increasing amounts of hydrogen, then, depending on intended molecular weight of the product, it may happen that the analysed hydrogen concentration will be relatively uncertain, and it may even be that it is below the detection limit. This makes control of molecular weight by hydrogen concentration very difficult/uncertain.

However, exactly the opposite happens with control based on the invention: usually the amount of hydrogen fed can be measured rather precisely/reproducibly. If the conversion of hydrogen is low, the amount of hydrogen leaving the reactor can be measured rather precisely. However, if there is low conversion of hydrogen, there is very little difference between the amount of hydrogen going in and out, and the difference between these is not precise/reproducible. But if the hydrogen conversion is high, then the difference between hydrogen going in and going out becomes large in comparison to the amount of hydrogen going out. Then the difference can be calculated quite precisely.

Also, there could occur disturbances in the relationship between hydrogen concentration in the reactor and the molecular weight of the polymer, due to different kinetics in the chain transfer reactions taking place with hydrogen. This might occur if there was a change in the reactor temperature, a change in the properties of the catalyst or a change in the mass transfer properties between the medium between polymer particles and the active sites.

Monomer concentration used as input in present control systems is based on monomer concentration outside polymer particles, so that disturbances in mass transfer properties of the medium between polymer particles and the active sites also will disturb the molecular weight control. (See T. F. McKenna et al., J. Appl. Pol. Sci., Vol 63. (1997), pages 315–322.)

In slurry loop reactors for polyethylene with settling legs, the monomer concentration usually is measured after the settling legs, and this does not give a precise estimate of ethylene concentration in the actual loop because of the extra conversion of ethylene taking place in the settling legs.

The correlation between the ratio of hydrogen feed rate (moles/hour) and polymer production rate (moles monomer consumed per hour) and $1/MFR_2$, in the preparation of a polyethene in a 500L loop reactor using propane as diluent and hex-1-ene as a comonomer is shown diagramatically in FIG. 1 of the accompanying drawings.

The present invention will now be described further with reference to the following non-limiting Examples.

EXAMPLE 1
Catalyst Preparation

Porous silica powder (Sylopol 55SJ from Grace Davison) was calcined for 4 hours in dry air at 600° C. The product, the catalyst support or carrier had a pore volume of about 1.55 mL/g.

An impregnation solution was prepared by mixing under nitrogen (nBu-Cp)$_2$ ZrCl$_2$ (Eurocene 5031 from Witco) 0.953 kg, MAO solution (30 wt % MAO in toluene from Albemarle SA) 92L, and toluene 25.4 kg.

86 kg of the carrier at 25° C. was placed in a steel vessel fitted with a stirrer. The impregnation solution was added over a period of 1.5 hours with agitation. Agitation was continued for a further 3 hours. Over a period of 7 hours, the mixture was dried by nitrogen flow and by heating to about 45° C. A final vacuum drying was effected to yield a supported catalyst having a Zr content of 0.14 wt % and an aluminium content of 11.0 wt %.

EXAMPLE 2
Two Stage Polymerization

Polymerizations was effected in an 8L steel reactor fitted with a stirrer and temperature control apparatus. As a reactor diluent, isobutane was used.
Stage 1

Isobutane, optionally containing hex-1-ene, and supported catalyst as described in Example 1 above, were charged into the reactor. The temperature and pressure in the reactor were raised to the desired values. Pressure was adjusted by addition of ethylene and optionally hydrogen, the addition being continuous so as to maintain the desired pressure. Where hex-1-ene was used as a comonomer, this was added in the initial isobutane and was also added continuously or repeatedly during the polymerization reaction to maintain a constant hex-1-ene concentration. At the end of polymerization, the pressure was reduced to boil off unreacted ethylene and traces of hydrogen.
Stage 2

The reaction mixture of stage 1 was maintained in the reactor and ethylene, hydrogen and optionally also hex-1-ene were added as described for Stage 1 except that different polymerization parameters (ethylene:hydrogen feed ratio, ethylene:hex-1-ene ratio, and reaction time) were used. There was no further addition of catalyst or isobutane. After the required reaction time, the polymerization reaction was stopped by venting off the overpressure in the reactor.

For comparative purposes, single stage polymerizations were also carried out using the conditions of Stage 1 above.

The results are presented in Example 5 below.

EXAMPLE 3
Polymerization

A supported catalyst was prepared analogously to Example 1 but with increased amounts of Zr complex and MAO such that the product had a Zr content of 0.25 wt % and an aluminium content of 13.6 wt %. This catalyst was used in a continuous 500L loop reactor for copolymerization of ethene and hex-1-ene, operating at 85° C. and 65 bar with 1 to 2 hours average residence time.

EXAMPLE 4
Polymerisation (Comparative)

A supported Ziegler Natta catalyst comprising a silica carrier, 2% by weight Ti, 1.9% by weight, 2.4% by weight Mg, Al and Cl (prepared in accordance with Example 3 of WO95/35323) was used as the catalyst in place of the metallocene catalyst in a one stage polymerization as described in Example 3.

EXAMPLE 5
Polymerization Parameters and Product Properties

The polymerization parameters and the properties of the products produced in the one and two stage polymerizations of Examples 2 to 4 are set out below in Tables 1,2 and 3 respectively.

TABLE 1A

| | Example No. | | | | | | | | |
|---|---|---|---|---|---|---|---|---|---|
| | 2.1 | 2.2 | 2.3 | 2.4 | 2.5[1] | 2.6* | 2.7* | 2.8 | 2.9[2] |
| Catalyst weight (g) | 0.692 | 0.745 | 0.797 | 0.736 | 0.676 | 0.775 | 0.748 | 0.732 | 0.651 |
| Reactor temperature (° C.) | 85 | 85 | 85 | 85 | 85 | 85 | 85 | 85 | 85 |
| Reactor pressure (bar. g) | 22 | 22 | 22 | 22 | 22 | 22 | 22 | 22 | 22 |
| Run time (stage 1/stage 2/total) (minutes) | —/—/60 | 24/34/60 | 23/37/60 | 26/34/60 | —/—/60 | 60 | 60 | 10/15/25 | 12/13/25 |
| Ethene partial pressure (bar) | 7.2 | 7.2 | 7.2 | 7.2 | 7.2 | 7.2 | 7.2 | 7.2 | 7.2 |
| Hydrogen in ethylene feed (stage 1/stage 2) | 2000/0 | 2000/0 | 2000/0 | 2000/0 | 0/2000 | 600 | 600 | 2000/0 | 0/2000 |

TABLE 1A-continued

| | Example No. | | | | | | | | |
|---|---|---|---|---|---|---|---|---|---|
| | 2.1 | 2.2 | 2.3 | 2.4 | 2.5[1] | 2.6* | 2.7* | 2.8 | 2.9[2] |
| (vol. ppm) | | | | | | | | | |
| Hexene concentration (stage 1/stage 2)(wt %) | 0/6 | 3/3 | 0/0 | 0.3 | 3/0 | 1 | 3 | 0/0 | 0/0 |
| Polymer weight (g) | 1470 | 2080 | 1370 | 1550 | 1730 | 1010 | 1410 | 1080 | 620 |
| Polymer fraction (stage 1/stage 2) | 86/14 | 65/35 | 50/50 | 65/35 | 35/65 | 100 | 100 | 50/50 | 50/50 |
| Yield (g PE/g cat.) | 2124 | 2792 | 1719 | 2106 | 2559 | 1303 | 1885 | 1475 | 950 |
| Activity (g PE/g cat. h) | 2124 | 2888 | 1719 | 2106 | 2559 | 1303 | 1885 | 3541 | 1710 |
| Density (g/mL) | 0.963 | 0.934 | 0.954 | 0.949 | 0.935 | 0.941 | 0.929 | 0.955 | 0.949 |
| $MFR_1$ of powder product (g/10 min) | 43 | 32 | 6.1 | 19 | 16 | 8.4 | 9.4 | 5.1 | 3.9 |
| $MFR_{21}$ of powder product (g/10 min) | — | — | 84 | ca. 400 | >200 | 130 | 148 | 114 | 73 |
| FRR 21/2 (powder product) | — | — | 13.8 | ca. 220 | >12.5 | 15.5 | 15.7 | 22.4 | 18.7 |

*Runs marked with * are comparative single stage polymerizations,
[1]Runs marked with [1] are comparative two stage polymerizations

TABLE 1B

| | Example No. | | | | | | |
|---|---|---|---|---|---|---|---|
| | 2.10* | 2.11* | 2.12 | 2.13 | 2.14* | 2.15* | 2.16* |
| Catalyst weight (g) | 0.775 | 0.740 | 0.712 | 0.683 | 0.804 | 0.790 | 0.812 |
| Reactor temperature (° C.) | 85 | 85 | 85 | 60 | 85 | 85 | 85 |
| Reactor pressure (bar. g) | 22 | 22 | 22 | 16.2 | 22 | 22 | 22 |
| Run time (stage 1/stage 2/total) (minutes) | 25 | 25 | 6/17/23 | 29/31/60 | 18 | 18 | 4 |
| Ethene partial pressure (bar) | 7.2 | 7.2 | 7.2 | 7.2 | 7.2 | 7.2 | 7.2 |
| Hydrogen in ethylene feed (stage 1/stage 2) (vol. ppm) | 1270 | 0 | 1270/0 | 2000/0 | 2000 | 2000 | 0 |
| Hexene concentration (stage 1/stage 2)(wt %) | 1 | 0 | 0/2 | 0/6 | 0 | 0 | 3 |
| Polymer weight (g) | 940 | 650 | 670 | 970 | 680 | 780 | 100 |
| Polymer fraction (stage 1/stage 2) | 100 | 100 | 25/75 | 75/25 | 100 | 100 | 100 |
| Yield (g PE/g cat.) | 1213 | 878 | 941 | 1420 | 846 | 987 | 123 |
| Activity (g PE/g cat. h) | 2911 | 2108 | 2455 | 1420 | 2819 | 3291 | 1847 |
| Density (g/mL) | 0.952 | 0.946 | 0.949 | — | 0.966 | 0.962 | 0.934 |
| $MFR_2$ of powder product (g/10 min) | 10.5 | 2.1 | 3.5 | 36 | 90 | 120 | 0.73 |
| $MFR_{21}$ of powder product (g/10 min) | 157 | 38 | 61 | — | — | — | 12.5 |
| FRR 21/2 (powder product) | 15.0 | 18.1 | 17.4 | — | — | — | 17.1 |

*Runs marked with * are comparative single stage polymerizations,
[1]Runs marked with [1] are comparative two stage polymerizations Regarding Example 2, it may be seen that the combination of high $H_2$/low comonomer in Stage 1 and low $H_2$/high comonomer in Stage 2 gives increased activity relative to the single stage polymerization effected for the same total polymerization time (see Examples 2.1 and 2.4 as compared with Examples 2.6 and 2.7.2.7 even has a significantly lower density which again leads to high activity). It may also be seen that the combination of high $H_2$ in Stage 1 and low $H_2$ in Stage 2 gives increased activity relative to the single stage polymerization effected for the same total polymerization time. Finally it may be seen that the combination of high $H_2$ in Stage 1 and low $H_2$ in Stage 2 gives improved yield as compared to the combination of low $H_2$ in stage 1 and high $H_2$ in Stage 2 (cf Examples 2.8 and 2.9).

From Examples 2.14 and 2.15 it may be seen that the first stage (earlier stage) of the process of the invention may be used to produce a polymer with a high (>50) $MFR_2$.

TABLE 2

| Example No. | 3.1 | 3.2 | 3.3 | 3.4 | 3.5 |
|---|---|---|---|---|---|
| Catalyst Feed Rate (g/hr) | 21.5 | 26.0 | 9.0 | 8.0 | 9.0 |
| Diluent (Propene) Feed Rate (kg/hr) | 30 | 25 | 27 | 34 | 26 |
| Ethene Feed Rate (kg/h) | 30 | 21.5 | 33 | 29.5 | 19 |
| Hex-1-ene Feed Rate (kg/h) | 0.92 | 0.8 | 0.9 | 1.3 | 0.55 |
| Hydrogen Feed Rate (g/h) | 0 | 0 | 1.5 | 1 | 5 |

TABLE 2-continued

| Example No. | 3.1 | 3.2 | 3.3 | 3.4 | 3.5 |
|---|---|---|---|---|---|
| Reactor Product | | | | | |
| Ethylene (mol . . . ) | 7 | 8 | 6.2 | 7.5 | 8.0 |
| Hydrogen (mol %) | 0 | 0 | ND | ND | ND |
| Solids (wt %) | 13 | 10 | 20 | 22 | 13 |
| $H_2/C_2H_4$ (mol/kmol) | 0 | 0 | >2.4 | >1.6 | >1.9 |
| $C_6H_{10}/C_2H_4$ (mol/kmol) | 35 | 33 | 40 | 50 | 40 |
| % $H_2$ Conversion | — | — | >87% | >90% | >96% |
| $MFR_2$ | 1.5 | 1.9 | 27 | 80 | 388 |

ND = not detectable

TABLE 3

| Example No. | 4.1 | 4.2 | 4.3 |
|---|---|---|---|
| Catalyst Feed Rate (g/hr) | 5.0 | 5.0 | 5.7 |
| Diluent (Propene) Feed Rate (kg/hr) | 53 | 52 | 50 |
| Ethene Feed Rate (kg/h) | 29.9 | 29.2 | 28.6 |
| But-1-ene Feed Rate (kg/h) | 2.4 | 2.5 | 2.4 |
| Hydrogen Feed Rate (g/h) | 32 | 31 | 33 |
| Reactor Product | | | |
| Ethylene (mol %) | 7.2 | 7.0 | 7.2 |
| Hydrogen (mmol . . . ) | 10.3 | 10.2 | 10.6 |
| Solids (wt %) | 18.9 | 18.4 | 18.6 |
| $H_2/C_2H_4$ (mol/kmol) | 138 | 141 | 143 |
| $C_4H_8/C_2H_4$ (mol/kmol) | 325 | 327 | 309 |
| % $H_2$ Conversion | 16 | 16 | 21 |

As can be seen from Tables 2 and 3, the use of the η-liganded catalyst (as would take place in the early polymerization stage of the process of the invention) enables higher $MFR_2$ and hydrogen conversion to be achieved than can be done with the conventional Ziegler Natta catalysts.

EXAMPLE 6

Catalyst Preparation

The catalyst was prepared in a glove box into a septabottle. Magnetic stirrer was used as a mixer. The following chemicals were used:

0.006 g $(n-BuCp)_2ZrCl_2$ 0.008 g $(SiMe_2(2-Me, 4-Ph Ind)_2ZrCl_2$ 1.2 ml 30% MAO (Albemarle)

0.3 ml toluene (n-BuCp=n-butylcyclopentadienyl 2-Me,4-Ph-Ind=2-methyl-4-phenyl-indenyl MAO=methylaluminoxane)

The chemicals were added together and stirred for half an hour. Impregnating was made dropwise on 1.0 g Sylopol 55SJ silic-carrier using pore filling method. Catalyst was stirred and dried with nitrogen-flow.

Polymerization

Polymerization was carried-out in a 2L reactor, 1L isobutane was used as medium. Polymerization temperature 85° C. and ethylene partial pressure 14 bar. Total pressure was 29 bar.

A multistage polymerization process was effected with polymerization in two steps: Step 1 isobutane with 0.18 wt % hexene and ethylene with 2350 ppm $H_2$; Step 2 isobutane with 6 wt % hexene and ethylene without $H_2$.

Catalyst was fed into the reactor with isobutane and the reactor was heated up to the polymerization temperature. Ethylene feeding was started at 75° C. The first step was stopped after 40 minutes by flashing out both isobutane and ethylene. The second step was started by adding isobutane with 6% hexene and then heating it up to the desired temperature again. Ethylene feeding was started the same way as in step 1. This polymerization step was effected for 20 minutes and was stopped by flashing the hydrocarbons out from the reactor.

EXAMPLE 7

(Comparative)

The catalyst was prepared according to the procedure of Example 1 using the following amount of chemicals:

11 mg $(n-BuCp)_2ZrCl_2$ 1.1 ml 30% MAO (Albemarle)

0.4 ml toluene 1.0 g Sylopol 55SJ $SiO_2$

Polymerization was conducted according to Example 1.

Polymer Product

The apparent viscosity vs apparent shear rate for the products of Example 1 (diamond) and Example 2 (square) are shown in FIG. 1 of the accompanying drawings. The apparent shear rate gives an indication at what shear rates the product will show unstable flow; the apparent viscosity increases with the molecular weight of the polymer.

What is claimed is:

1. A process for olefin polymerization, which process comprises at least two polymerization stages, a relatively earlier of said stages comprising polymerizing ethylene and optionally a $C_{4-10}$ α-olefin in the presence of hydrogen and a Zr, Hf or Ti metal containing metallocene olefin polymerization catalyst whereby to produce a first polymerization product, and a relatively later of said stages comprising polymerizing ethylene and optionally a $C_{4-10}$ α-olefin in the presence of metallocene olefin polymerization catalyst whereby to yield a polymerization product wherein at least 60% by weight of the product is derived from ethylene and said product has a lower $MFR_2$ than said first polymerization product wherein hydrogen is substantially entirely consumed in the relatively earlier of said stages.

2. A process as claimed in claim 1 wherein comonomer is incorporated in the earlier and/or later of said stages.

3. A process as claimed in claim 1 comprising at least one further polymerization stage following the relatively later stage.

4. A process as claimed in claim 3 wherein said further polymerization stage produces a hetero phasic polymer.

5. A process as claimed in claim 1 further comprising drying steps.

6. A process as claimed in claim 1 wherein the polymer product is blended with one or more further materials.

7. A process as claimed in claim 6 wherein said further materials are one or more of further polymers, antioxidants, radiation stabilizers, antistatic agents, fillers, plasticizers, carbon black or colours.

8. A process as claimed in claim 1 wherein said process further comprises granulation, extrusion or pelletization.

9. A process as claimed in claim 1 wherein said polymerization product is a copolymer at least 60% by weight of which derives from ethylene.

10. A process as claimed in claim 1 wherein said other α-olefin is but-1-ene, pent-1-ene, hex-1-ene, oct-1-ene or a mixture thereof.

11. A process as claimed in claim 1 wherein the catalysts used in the different polymerization stages are the same.

12. A process as claimed in claim 11 wherein the catalyst used in the relatively early polymerization stage is one which substantially depletes the reaction mixture of hydrogen.

13. A process as claimed in claim 12 wherein said metallocene comprises a group of formula I:

$$CpY_m \quad (I)$$

where Cp is an unsubstituted, mono-substituted or polysubstituted homo or heterocyclic cyclopentadienyl, indenyl, tetrahydroindenyl, fluorenyl, benzindenyl, cyclopenta[1] phenanthrenyl, azulenyl, or octahydrofluorenyl ligand; m is zero or an integer having a value of 1, 2, 3, 4, or 5; and where present each Y which may be the same or different is a substituent attached to the cyclopentadienyl ring moiety of Cp and selected from the halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, to a second unsubstituted, mono-substituted or polysubstituted homo or heterocyclic cyclopentadienyl, indenyl, tetrahydroindenyl, fluorenyl or octahydrofluorenyl ligand group.

14. A process as claimed in claim 13 wherein in the η-bonding ligands of formula I, the rings fused to the homo or heterocyclopentadienyl rings are themselves substituted by halogen atoms or groups containing 1 to 10 carbon atoms.

15. A process as claimed in claim 13 wherein said Cp is selected from cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indenyl, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1, 4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

16. A process as claimed in claim 12 wherein said catalyst complex comprises further ligands selected from halide, hydride, alkyl, aryl, alkoxy, aryloxy, amide, carbamide or other two electron donor groups.

17. A process as claimed in claim 11 wherein said catalyst system further comprises one or more cocatalysts or catalytic activators.

18. A process as claimed in claim 17 wherein for metallocene complexes aluminoxane or boron compound cocatalysts are used.

19. A process as claimed in claim 12 wherein said metallocene is supported on a solid substrate for use in polymerization reactions.

20. A process as claimed in claim 11 wherein said process is carried out in one reactor.

21. A process as claimed in claim 11 wherein said process is carried out in a series of two or more reactors.

22. A process as claimed in claim 21 wherein said reactors may be loop and/or gas phase reactors.

23. A process as claimed in claim 22 wherein a loop phase reactor is used and the temperature ranges from 60–110° C., the pressure from 30–70 bar, the mean residence time is 30–80 minutes and where $H_2$ is used to control molecular weight $MFR_2$, the hydrogen pressure is 0.05 to 20 bar.

24. A process claimed in claim 22 wherein a gas phase reactor is used and the temperature ranges from 60–110° C., the pressure from 10–25 bar, the mean residence time is 20–300 minutes and where hydrogen is used to control molecular weight/$MFR_2$, the hydrogen pressure is 0.05–20 bar.

25. A process as claimed in claim 1 wherein the polymerization takes place continuously.

* * * * *